United States Patent [19]
Absher et al.

[11] 3,841,063
[45] Oct. 15, 1974

[54] AIR TREATING APPARATUS

[76] Inventors: Larry R. Absher; Richard M. Woodie, both of Sparta, N.C. 28675

[22] Filed: Nov. 8, 1971

[21] Appl. No.: 196,452

[52] U.S. Cl.......................... 55/228, 55/257, 55/358, 55/385, 55/467, 55/DIG. 20, 55/DIG. 41, 110/119, 261/3, 261/5, 261/118, 261/DIG. 9
[51] Int. Cl............................................. B01d 47/06
[58] Field of Search ............ 55/220, 261, 262, 263, 55/264, 265, 266, 467, 468, 471, DIG. 20, 228, 257, 358, 385, DIG. 41; 98/115 R; 261/17, 77, 121, 126, 115, 3, 116, 117, 5, 118, DIG. 9; 110/119, 126, 127, 128, 129, 145, 146, 147, 148, 150, 161, 162, 184

[56] References Cited
UNITED STATES PATENTS
906,423    12/1908    Hockman................. 261/DIG. 9
1,639,179  8/1927    Hamel............................ 261/116 X
2,646,263  7/1953    Goldberg......................... 55/259 X
3,248,860  5/1966    Carlson........................... 261/118 X
3,462,919  8/1969    Zelman............................ 55/468 X FOREIGN PATENTS OR APPLICATIONS
606,395    7/1960    Italy................................. 261/115

Primary Examiner—Dennis E. Talbert, Jr.

[57] ABSTRACT

An apparatus for removing fly ash, dust and other types of solid particles from flues and stacks to reduce the pollution of air. Smoke, ash and dust are drawn or pushed by a fan into a barrel-like configuration having a series of water spray jets mounted therein. Spraying the ash or dust increases the weight thereof causing it to settle to the bottom of the barrel-like member. The apparatus may be placed directly upon a stack or supported upon a tower located adjacent the stack.

3 Claims, 5 Drawing Figures

PATENTED OCT 15 1974          3,841,063

INVENTORS
LARRY R. ABSHER
RICHARD M. WOODIE

BY attorney

AIR TREATING APPARATUS

BRIEF SUMMARY AND OBJECTS OF THE INVENTION

This invention is particularly adapted for separating dust, ash and other types of contaminants from gases discharged from various flues, stacks or chimneys to reduce the pollution of air.

The present invention relates to a new and improved air cleaning apparatus adapted to be mounted upon the upper end of a stack or chimney or mounted upon a supporting tower and positioned adjacent the upper end of the stack or chimney. In each instance the contaminated air is drawn or pushed through a hollow housing by means of a motor driven fan. A series of spray nozzles are provided around the inner periphery of the barrel for wetting the dust and ash making it heavy causing it to fall and collect on the bottom of the housing and in a receptacle or trough extending lengthwise of the housing. The dirty water, ash and dust particles are directed through a downspout to a filter area.

In certain embodiments, side boards may be provided on the barrel for preventing cross winds from blowing the smoke and dust away from the apparatus. In other embodiments, the hollow housing may be mounted directly over the end of a stack.

One of the primary objects of the invention is the provision of an air treating apparatus for separating contaminants from the discharged gasses to reduce pollution.

Another object of the invention is the provision of an improved air treating apparatus which utilizes a water vapor to remove dust and ash from the gasses.

A further object of the invention is the provision of an air treating apparatus which is efficient in operation and relatively simple in construction.

Still another object of the invention is an apparatus which requires no filters, baffles or tortuous separating passages for separating the contaminants from the gasses.

Other objects and advantages of the invention will become apparent to those skilled in the art during the course of the following detailed description.

DETAILED DESCRIPTION OF THE INVENTION

Figure 1:
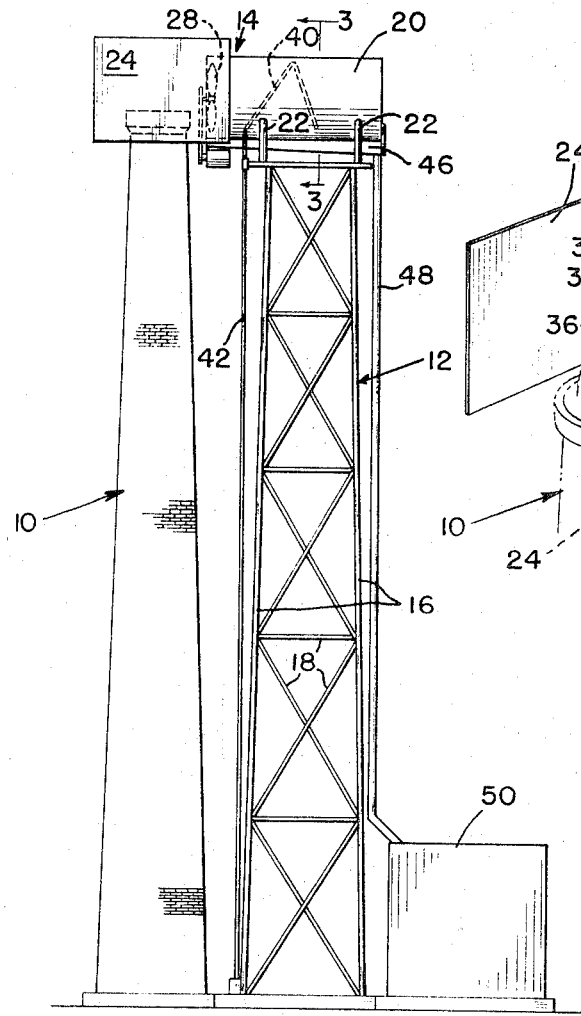
FIG. 1 is an elevational view of one embodiment of the air treating apparatus wherein the apparatus is mounted on a tower adjacent the upper end of a stack or chimney, and illustrating side boards positioned at the opposite sides of the stack.

Referring now to FIG. 1, the stack 10 for an incinerator or other means, not shown, carries the smoke and suspended particles produced in burning various materials, such as garbage or refuse. Located at the top of the tower 12, which extends vertically to substantially the same height as the height of the stack 10, is the air treating apparatus 14. The tower 12 which includes a plurality of upright supports 16 interconnected by cross bracing 18, is illustrative of one type of installation although it will be readily apparent that the tower may be changed to suit a particular installation. Rather than being supported upon a tower 12, the air treating apparatus 14 may be mounted directly upon the upper end of the stack 10 if the stack is structurally strong enough to support the apparatus 14.

Figure 2:
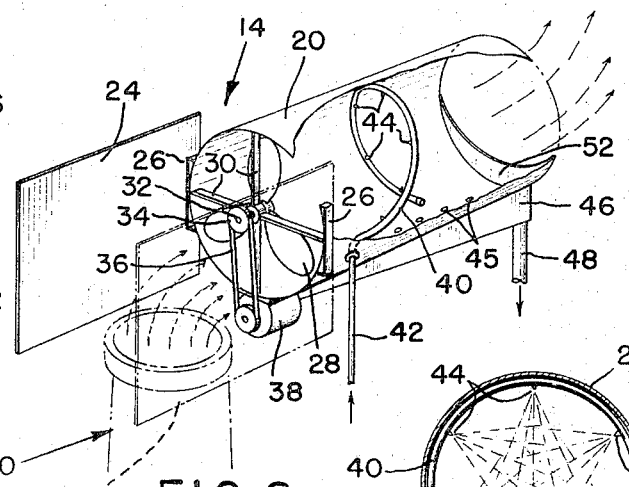
FIG. 2 is an enlarged fragmentary view of the air treating apparatus of FIG. 1 illustrating the barrel arrangement adapted to have contaminated air directed therethrough.
Figure 3:
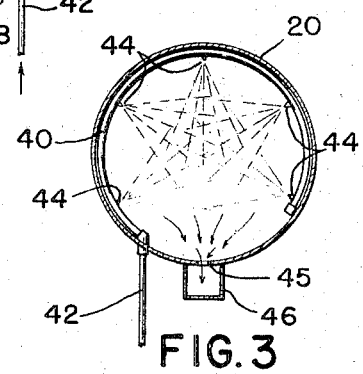
FIG. 3 is a view of the barrel arrangement taken along line 3—3 of FIG. 1 illustrating the spray pattern for the nozzles and the trough for collecting dirty water.

Referring to FIGS. 1–3, the air treating apparatus 14 includes an elongated hollow housing comprising a barrel-like configuration 20, having both ends open, mounted upon brackets 22 secured to the tower 12. The barrel 20 is mounted such that one open end is located adjacent to the upper end of stack 10, as shown in FIGS. 1 and 2, and such that the smoke and other particles are directed into the barrel as shown by the arrows of FIG. 2. While the barrel has been shown as cylindrical, it is to be understood that other geometric forms may be used equally well.

To facilitate directing of the smoke and particles through the barrel 20 and to prevent cross winds from blowing smoke away from the barrel, vertically disposed side boards 24 are provided at opposed sides of and overlap the end of the stack, as shown in FIG. 1. The side boards 24 are fixed to brackets 26 secured to opposite sides of the barrel 20.

In order to draw the smoke, dust and particles, discharged from stack 10, into the barrel 20, a fan 28 is provided in the open end of the barrel adjacent the stack. While the particular type of fan may vary, it is secured to a shaft 32 which is mounted for rotation in the support members 30. The shaft 32 is driven through pulley 34 and belt 36 which receive their drive from a motor 38. Rather than being mounted outside of the barrel 20, the motor may be located centrally of the fan to drive the shaft 32 directly. Preferably, the motor 38 is a variable speed electric motor.

Means are provided for spraying water within the barrel-like member 20. For this purpose, a pipe 40 in the form of a coil or helix extends substantially around the inner periphery of the drum. One end of the pipe 40 is closed while the other end is connected to a water supply pipe 42 which extends down the tower 12 to a water source, not shown. Arranged around the coil pipe 40 are a series of nozzles 44 which form high pressure sprays intersecting each other and staggered down the drum, as shown by FIG. 3. The nozzles produce very finely divided water particles which effectively form a wall into which the discharge gasses and particles are directed by the fan 28. As the contaminated laden gasses pass through the fine mist, the dust, ash and other particles become heavy due to the water spray causing them to settle to the bottom of the barrel 20 before reaching the outlet end of the barrel. Alternatively, the pipe 40 may be located outside of the barrel with the nozzles 44 extending to the inner periphery.

The bottom of the barrel 20 is provided with a series of openings 45 which directs the ash, dust and dirty water to a receptacle or trough 46 secured beneath the barrel 20. The trough 46 has a tapered base portion for directing the particles of dirty water to a drain pipe 48 which directs the dirty water to a filter mechanism 50. The water may be filtered and recirculated back to the nozzles 44 through the supply pipe 42.

A plate 52 may be provided in the lower end of barrel 20 remote from fan 28 to prevent the spray water from escaping from the barrel and to direct the cleaned gasses upward, as shown by FIG. 2. Alternatively, the elbow 53, such as shown by FIG. 5, may be used rather than the plate 52.

Figure 4:
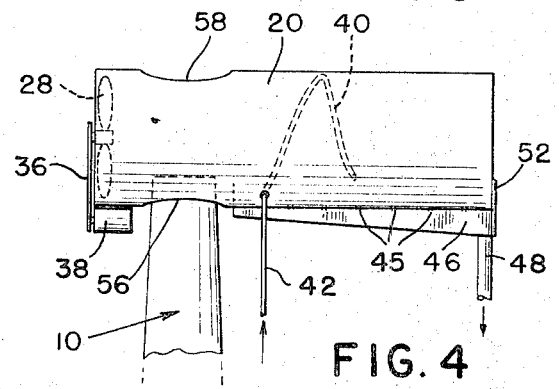
FIG. 4 is a side elevational view of a modified embodiment of the air treating apparatus wherein the barrel arrangement is located directly over the upper end of a stack.

FIG. 4 relates to a modified embodiment of the air treating apparatus wherein an opening 56 is provided in the lower portion of the barrel 20 for receiving the upper end of stack 10. A second opening 58, above opening 56, permits the gasses, smoke, etc., to pass through the barrel when the fan and water jets are not in operation. It is also to be noted that the water pipe 40 within the barrel is arranged in a helical fashion.

Figure 5:
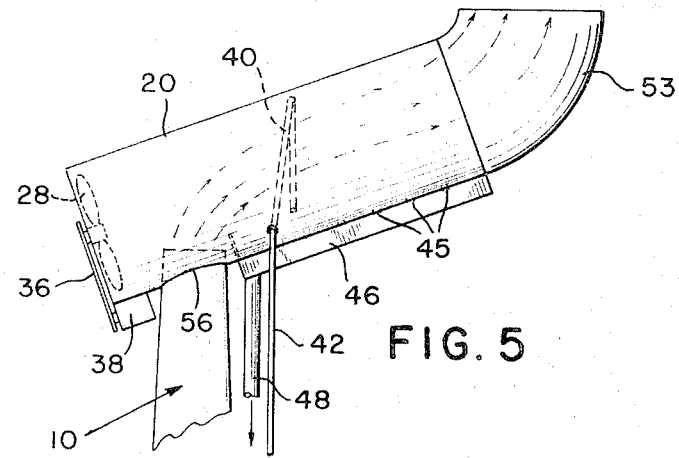
FIG. 5 is a side elevational view of still another embodiment of the air treating apparatus wherein the barrel arrangement is angularly disposed relative to the stack.

FIG. 5 relates to an embodiment similar to FIG. 4 wherein the barrel 20 is disposed at an angle upon the upper end of stack 10. However, due to the angular inclination of the barrel, an opening, such as 58 in FIG. 4, is not required. It is to be noted that the fan pushes the smoke, ash, etc., through the barrel in the embodiments of FIGS. 4 and 5 whereas in the embodiment of FIGS. 1–3 fan 28 draws the smoke and ash into the barrel.

We claim:

1. An apparatus comprising: a smoke stack; an elongated, cylindrical barrel like configured, generally hollow, substantially unobstructed housing disposed with its longitudinal axis extending horizontally, said housing having an inlet end and an outlet end, both of said ends being substantially open;

first brackets comprising a pair of brackets secured to opposite exterior sides of said housing at a point between said inlet end and said outlet end, said point being closely adjacent to said inlet end;

a tower disposed closely adjacent to, substantially parallel to and coextensive with said stack, said tower including a plurality of upright supports interconnected by cross bracing, and second brackets at the top of said tower, said housing being mounted on the top of said tower on said second brackets with said inlet end of said housing disposed closely adjacent to but spaced apart from the top of said smokestack, said housing being supported solely by said tower;

a pair of substantially rectangular, vertically disposed side boards disposed at opposed sides of said stack, said boards extending vertically from a point below the bottom of said housing and below the top of said stack to a point above the top of said housing and the top of said stack, said boards extending horizontally from a point between said inlet end and said outlet end of said housing to a point beyond the side of said stack remote from said housing, each of said boards being secured to a respective one of said first brackets, each of said boards extending closely adjacent to, but spaced apart from said stack, said boards being the sole means for preventing cross winds from blowing smoke away from said housing;

fan support members disposed in said housing closely adjacent to said inlet end;

a rotatable fan shaft, coaxial with said housing and rotatably mounted in said support members, said shaft extending from a first end thereof disposed between said members and said outlet end to a second end thereof disposed between said stack and said inlet end;

a fan mounted on said first end of said shaft, said fan being operatively constructed and arranged for drawing smoke from the top of said stack into said inlet end and blowing said smoke through said housing and out said outlet end;

a pulley mounted on said second end of said shaft;

a variable speed electric motor mounted on the bottom of said housing closely adjacent to said inlet end thereof, said motor having a horizontally extending drive shaft which extends from said motor to a point between said inlet end and said stack;

belt means drivingly connecting said pully and drive shaft for rotation of said fan;

a water source disposed at the base of said tower; said source being disposed between said tower and said stack;

a conduit extending from said source to said, housing at a point closely adjacent to the bottom thereof, said conduit being disposed between said tower and said stack;

a pipe having an open end and a closed end, said open end being connected to the upper end of said conduit, said pipe being disposed in said housing between said fan and said outlet end, said open end being disposed in close proximity to said inlet end and, said closed end being disposed in close proximity to said outlet end, said pipe being in the form of a helix extending substantially around the inner periphery of said housing, said pipe having a plurality of high pressure spray nozzles extending therefrom, said nozzles being operatively constructed and arranged for producing sprays intersecting each other and staggered down the housing and for effectively forming a wall into which the discharge gasses and particles are directed by said fan;

a series of openings disposed in a row extending generally from said inlet end to said outlet end, said openings being disposed in the bottom of said housing;

a trough mounded on the bottom of said housing below said openings for receiving liquid draining through said openings, said trough having a tapered base portion which is lower at the end of said trough adjacent said outlet end than it is at the end of said trough adjacent said inlet end;

a liquid filter mechanism disposed at the bottom of said tower on the side thereof remote from said stack;

a drain pipe means extending from the lower end of said trough to said filter; and a generally crescent shaped plate means disposed in the lower portion of said outlet end of said housing for preventing the spray water from escaping from said housing and for direction the cleaned gases upward.

2. An apparatus as recited in claim 1 having means for recirculating filtered water back to said nozzles through said conduit.

3. An apparatus as recited in claim 1 wherein said stack is a stack for an incinerator.

* * * * *